US011823215B2

United States Patent
Nayak et al.

(10) Patent No.: US 11,823,215 B2
(45) Date of Patent: Nov. 21, 2023

(54) TAX CLIENT EXIT PREDICTOR

(71) Applicant: ADP, Inc., Roseland, NJ (US)

(72) Inventors: Durga Nayak, Hyderabad (IN);
Onkarnatha Reddy Gangireddy, Hyderabad (IN); Tulasi Navuluri, Hyderabad (IN); Saikrishna Akirala, Hyderabad (IN)

(73) Assignee: ADP, Inc., Roseland, NJ (US)

( * ) Notice: Subject to any disclaimer, the term of this patent is extended or adjusted under 35 U.S.C. 154(b) by 602 days.

(21) Appl. No.: 16/518,686

(22) Filed: Jul. 22, 2019

(65) Prior Publication Data

US 2021/0027312 A1 Jan. 28, 2021

(51) Int. Cl.
*G06Q 10/06* (2023.01)
*G06Q 30/0201* (2023.01)
*G06Q 10/0635* (2023.01)
*G06Q 10/067* (2023.01)

(52) U.S. Cl.
CPC ....... *G06Q 30/0201* (2013.01); *G06Q 10/067* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 5,822,410 A | 10/1998 | McCausland et al. | |
| 8,280,773 B2 | 10/2012 | Srinivasan et al. | |
| 8,630,892 B2 | 1/2014 | Bhalla et al. | |
| 8,712,828 B2 | 4/2014 | Maga et al. | |
| 2012/0030076 A1* | 2/2012 | Checco | G06Q 40/123 705/31 |
| 2014/0297673 A1* | 10/2014 | Ahn | G06Q 10/10 707/758 |

(Continued)

FOREIGN PATENT DOCUMENTS

WO  WO-2010082885 A1 * 7/2010 ............. G06Q 30/02

OTHER PUBLICATIONS

Sharma et al., "A Neural Network based Approach for Predicting Customer Churn in Cellular Network Services," International Journal of Computer Applications (0975-8887), vol. 27, No. 11, Aug. 2011, pp. 26-31.

(Continued)

*Primary Examiner* — Alan Torrico-Lopez
(74) *Attorney, Agent, or Firm* — Foley & Lardner LLP

(57) ABSTRACT

An illustrative embodiment provides a computer-implemented method, computer system, and computer program product for identifying potential client churn. Client profile information is aggregated for a set of clients. Tax services data related to providing tax services for the set of clients is aggregated. A number of former clients who have terminated the tax services is modeled according to the client profile information and the tax services data. The client profile information and the tax services data for a number of current clients who have not terminated the tax services is compared to the modeled number of former clients. A number of at-risk clients is identified from among the number of current clients based on dissimilarities between the current clients and the former clients. The number of at-risk clients are displayed on a graphical user interface.

24 Claims, 16 Drawing Sheets

(56) References Cited

U.S. PATENT DOCUMENTS

2015/0371163 A1* 12/2015 Noh .................. G06Q 10/0635
                                                    705/7.28
2020/0120003 A1*  4/2020 Sridhar ................ G06Q 30/02
2020/0273050 A1*  8/2020 Doherty ................ G06N 20/00
2020/0358898 A1* 11/2020 Singer .................... G10L 17/00
2021/0182956 A1*  6/2021 Rao .................... G06Q 30/0201

OTHER PUBLICATIONS

Amin et al., "Customer churn prediction in the telecommunication sector using a rough set approach," Neurocomputing 237, 2017, pp. 242-254.

Guo-En et al., "Model of Customer Churn Prediction on Support Vector Machine," Systems Engineering—Theory and Practice, vol. 28, Issue 1, Jan. 2008, pp. 71-77.

Kumar et al., "Predicting credit card customer churn in banks using data mining," Int. J. Data Analysis Techniques and Strategies, vol. 1, No. 1, pp. 4-28.

\* cited by examiner

TAX CLIENT EXIT PREDICTOR

BACKGROUND INFORMATION

1. Field

The present disclosure relates generally to an improved computer system and, in particular, to modeling at-risk clients according to client profile information, tax services information, and similarities to former clients who have terminated tax services.

2. Background

Human capital management (HCM) systems are software-based solutions for administering various human resource functions such as payroll, tax, and employee benefits. As part of the tax services, a HCM solution determines the amount of money to deduct from an employee's paycheck for various taxes and employee contributions to various employer provided benefits such as retirement plans, health insurance, and life insurance. The HCM solution remits these monies to the various government agencies according to the applicable tax laws schedules.

Problems with tax services can often lead to client churn. However, these issues are often not discovered until the client has terminated services provided by the HCM service provider. Therefore, an improved HCM system for identifying potential at risk-clients is desirable.

SUMMARY

An illustrative embodiment provides a computer-implemented method for identifying the control client churn. The method comprises aggregating client profile information for a set of clients. The method comprises aggregating tax services data related to providing tax services for the set of clients. The method comprises modeling, by a number of processors, a number of former clients who have terminated the tax services according to the client profile information and the tax services data. The method comprises comparing, by a number of processors, the client profile information and the tax services data for a number of current clients who have not terminated the tax services to the modeled number of former clients. The method comprises identifying, by a number of processors, a number of at-risk clients from among the number of current clients based on dissimilarities between the current clients and the former clients. The method comprises displaying, by a number of processors, the number of at-risk clients on a graphical user interface.

Another illustrative embodiment provides a computer system for identifying potential client churn. The computer system comprises a bus system, a storage device connected to the bus system and a number of processors. The number of processors execute program instructions stored on the storage device. the number of processors execute the program instructions to: aggregate tax services data related to providing tax services for the set of clients; to model a number of former clients who have terminated the tax services according to the client profile information and the tax services data; to compare the client profile information and the tax services data for a number of current clients who have not terminated the tax services to the modeled number of former clients; to identify a number of at-risk clients from among the number of current clients based on dissimilarities between the current clients and the former clients; and to display the number of at-risk clients on a graphical user interface.

Yet another illustrative embodiment provides a computer program product for identifying potential client churn. The computer program product comprises a non-transitory computer readable storage medium having program code stored thereon. The program code includes code for aggregating tax services data related to providing tax services for the set of clients. The program code includes code for modeling a number of former clients who have terminated the tax services according to the client profile information and the tax services data. The program code includes code for comparing the client profile information and the tax services data for a number of current clients who have not terminated the tax services to the modeled number of former clients. The program code includes code for identifying a number of at-risk clients from among the number of current clients based on dissimilarities between the current clients and the former clients. The program code includes code for displaying the number of at-risk clients on a graphical user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that service providers are constantly looking to recruit and retain client organizations.

The illustrative embodiments further recognize and take into account that identifying reasons for client churn is often more difficult and time-consuming than desired.

Illustrative embodiments provide a method and system for identifying potential client churn. The method comprises aggregating client profile information for a set of clients. The method comprises aggregating tax services data related to providing tax services for the set of clients. The method comprises modeling, by a number of processors, a number of former clients who have terminated the tax services according to the client profile information and the tax services data. The method comprises comparing, by the number of processors, the client profile information and the tax services data for a number of current clients who have not terminated the tax services to the modeled number of former clients. The method comprises identifying, by the number of processors, a number of at-risk clients from among the number of current clients based on dissimilarities between the current clients and the former clients. The method comprises displaying, by the number of processors, the number of at-risk clients on a graphical user interface.

Figure 1:
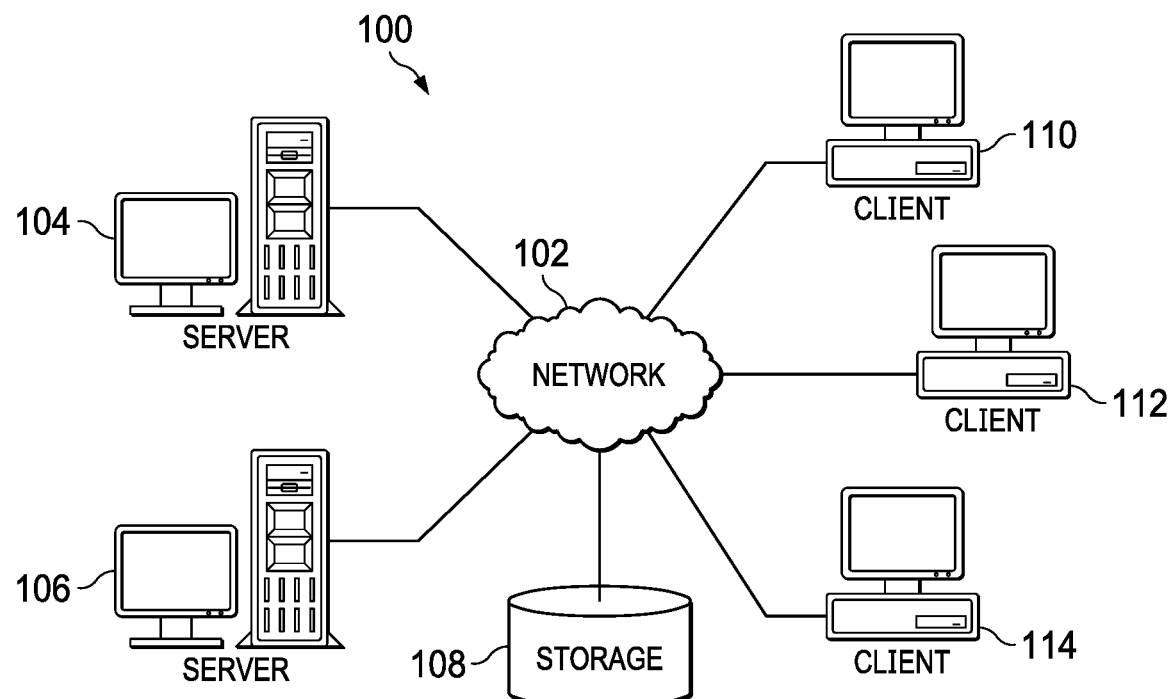
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer-implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
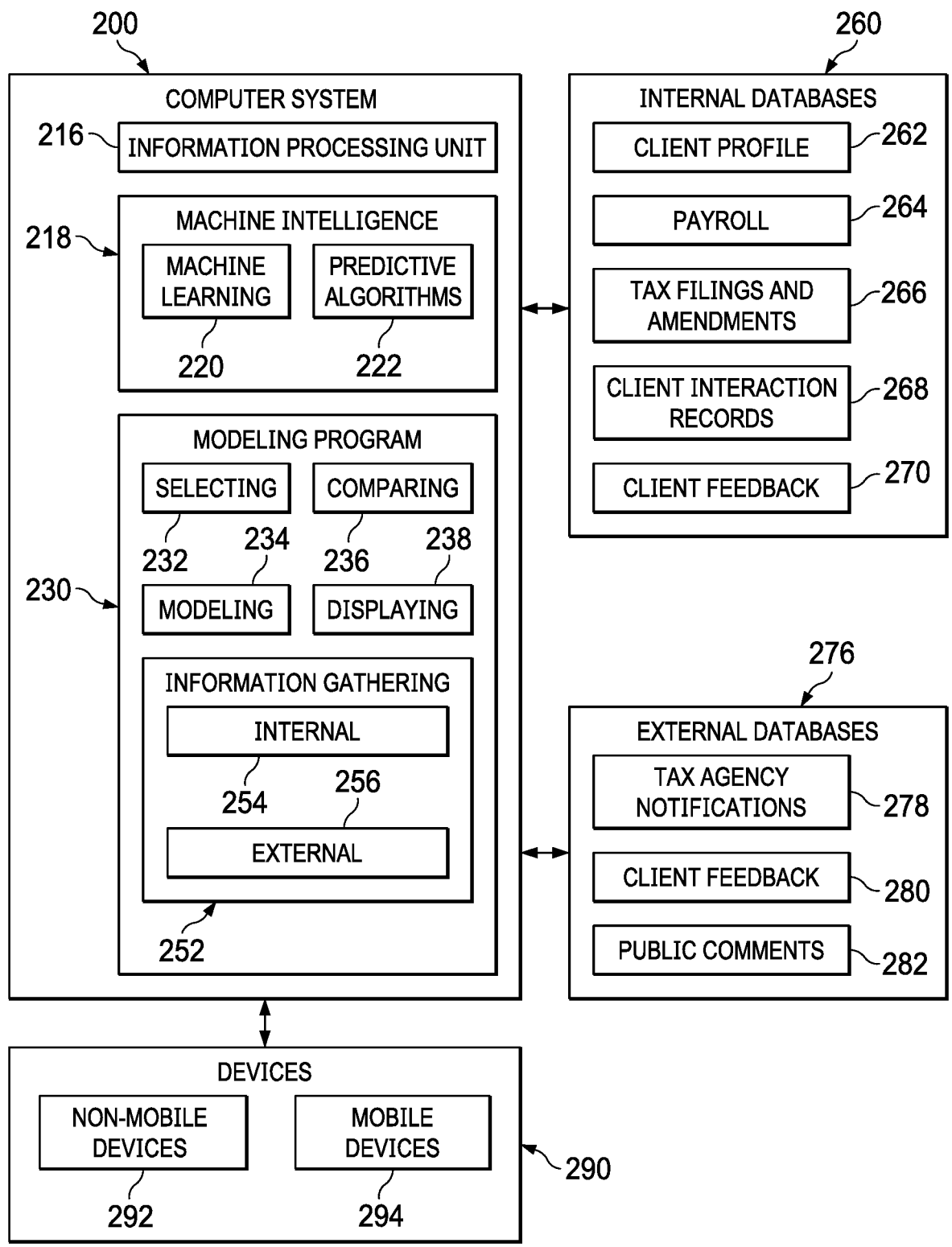
FIG. 2 is a block diagram of a computer system for modeling in accordance with an illustrative embodiment.

Turning to FIG. 2, a block diagram of a computer system for modeling is depicted in accordance with an illustrative embodiment. Computer system 200 comprises information processing unit 216, machine intelligence 218, and modeling program 230. Machine intelligence 218 comprises machine learning 220 and predictive algorithms 222.

In an embodiment, information processing unit 216 comprises one or more conventional general purpose central processing units (CPUs). In an alternate embodiment, information processing unit 216 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating point operations per second than a CPU, on the order of 100x more. GPUs can be clustered together to run neural networks comprising hundreds of millions of connection nodes.

Machine intelligence 218 can be implemented using one or more systems such as an artificial intelligence system, a neural network, a Bayesian network, an expert system, a fuzzy logic system, a genetic algorithm, or other suitable types of systems. Machine learning 220 and predictive algorithms 222 may make computer system 200 a special purpose computer for dynamic predictive modelling of employees and career paths.

Machine learning 220 can be supervised machine learning. Supervised machine learning comprises providing the machine with training data and the correct output value of the data. During supervised learning, the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

Machine learning 220 can be unsupervised machine learning. If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Machine learning 220 can be reinforcement machine learning. Whereas supervised and unsupervised methods learn from a dataset, reinforcement learning methods learn from interactions with an environment. Algorithms such as Q-learning are used to train the predictive model through interacting with the environment using measurable performance criteria.

Modeling program 230 comprises information gathering 252, selecting 232, modeling 234, comparing 236, and displaying 238. Information gathering 252 comprises internal 254 and external 256.

Computer system 200 is connected to internal databases 260, external databases 276, and devices 290. Devices 290 comprise non-mobile devices 292 and mobile devices 294.

Internal databases 260 comprise client profile 262, payroll 264, tax filings and amendments 266, client interaction records 268, and client feedback 270. Internal 254 is configured to gather data from internal databases 260.

Client profile 262 may include one or more different types of information. For example, client profile 262 may include information such as, but not limited to, a type of business entity, such as a company or corporation, a number of employees, a general ledger, an average size of payroll, a number of years in business, a financial standing of the business entity, a current tax state for the business entity, a business start date, an industry type, a status of funds, a start date for using tax services, or some other type of information.

Tax filings and amendments 266 may include one or more different types of information. For example, tax filings and amendments 266 may include information such as, but not limited to, a type of amendment, a source of the amendment, an amendment start date, a number of jurisdictions amended under the amendment, a number of employees amended under the amendment, charges imposed for the amendment, a waiver amount applied to the amendment, a total check amount requested, a refund amount realized from the amendment, a credit amount realized from the amendment, a penalty amount for the amendment, an interest amount for the amendment, a penalty responsibility indicator, an interest responsibility indicator, an amendment priority, an amendment billed to, a percentage of amendment Bbill borne by client, a percentage of amendment bill borne by Region, a percentage of amendment bill borne by tax, and a complexity W2 calculation involved, as well as other relevant information.

Client interaction records 268 may include one or more different types of information. For example, client interaction records 268 may include information such as, but not limited to, a date of a service interaction, a time taken to close the customer service interaction, a type of service requested, an indication of completion of the customer service interaction, a creditor indication of the client, a waiver request, a check request, a late deposit, a CPA indication, a duplicate indicator, a multi-tax indicator, a request origin indicator, an agency call indicator, and a reason indicator, as well as other relevant information.

Client feedback 270 may include one or more different types of information. For example, client feedback 270 may include information such as, but not limited to, feedback in client service interactions and feedback in client satisfaction surveys, as well as other relevant information.

External databases 276 comprise tax agency notifications 278, client feedback 280, and public comments 282 regarding tax services. External 256 is configured to gather data from external databases 276.

Tax agency notifications 278 may include one or more different types of information. For example, tax agency notifications 278 may include information such as, but not limited to, a date of the tax agency notification, a priority of the tax agency notification, an amount indicated in the tax agency notification, a principal and interest amount indicated in the tax agency notification, a tax type indicated in the tax agency notification, and a filing type indicated in the tax agency notification, as well as other relevant information.

Client feedback 280 may include one or more different types of information. For example, client feedback 280 may include information, such as, but not limited to, feedback in client satisfaction surveys, as well as other relevant information.

Public comments 282 may include one or more different types of information. For example, public comments 282 may include information such as, but not limited to, feedback in public comments on social media networks, as well as other relevant information.

Thus, information processing unit 216, machine intelligence 218, and modeling program 230 transform a computer system into a special purpose computer system as compared to currently available general computer systems that do not have a means to perform machine learning and predictive modeling such as computer system 200 of FIG. 2. Currently used general computer systems do not have a means to accurately model potential client churn.

Figure 3:
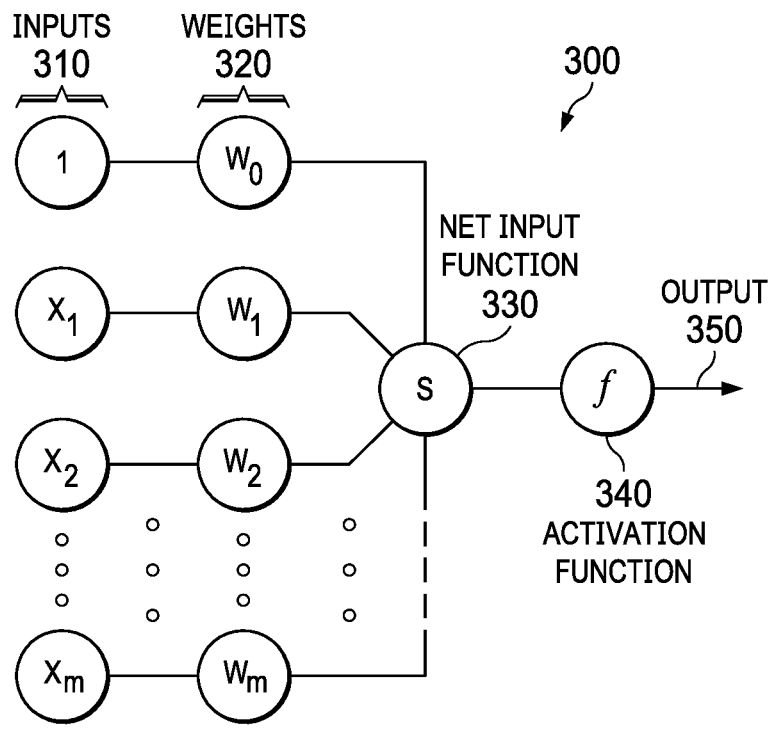
FIG. 3 is a diagram that illustrates a node in a neural network in accordance with an illustrative embodiment.

FIG. 3 is a diagram that illustrates a node in a neural network in accordance with an illustrative embodiment. A neural network that includes node 300 is one illustrative example of machine learning 220 of FIG. 2.

Node 300 combines multiple ones of inputs 310 from other nodes. Each one of inputs 310 is multiplied by a respective one of weights 320 that either amplifies or dampens that input, thereby assigning significance to each input for the task that the algorithm is trying to learn. The weighted inputs are collected by net input function 330 and then passed through activation function 340 to determine output 350. The connections between nodes are called edges. The respective weights of nodes and edges might change as learning proceeds, thus increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Stochastic neural networks are a type of network that incorporate random variables, which makes them well suited for optimization problems. This is done by giving the nodes in the network stochastic (randomly determined) weights or transfer functions. A Boltzmann machine is a type of stochastic neural network in which each node is binary valued, and the chance of it firing depends on the other nodes in the network. Each node is a locus of computation that processes an input and begins by making stochastic decisions about whether to transmit that input or not. The weights (coefficients) that modify inputs are randomly initialized.

Figure 4:
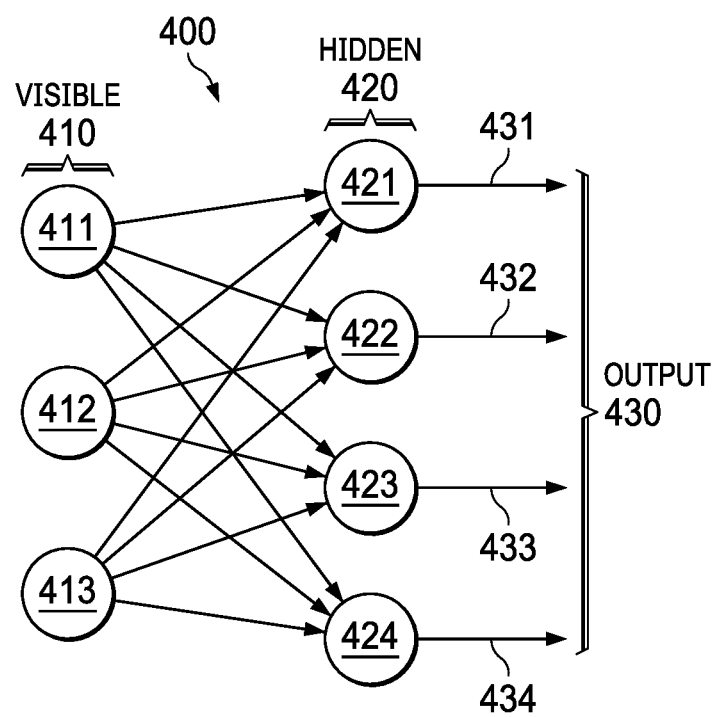
FIG. 4 is a diagram illustrating a restricted Boltzmann machine in accordance with an illustrative embodiment.

FIG. 4 is a diagram illustrating a restricted Boltzmann machine in accordance with an illustrative embodiment. As shown in FIG. 4, nodes in Boltzmann machine 400 are divided into a layer of visible nodes 410 and a layer of hidden nodes 420. A common problem with general Boltzmann machines is that they stop learning correctly when they are scaled up. Restricted Boltzmann machines (RBMs) overcome this problem by using an architecture that does not allow connections between nodes in the same layer. As can be seen in FIG. 4, there is no intralayer communication between nodes.

Visible nodes 410 are those that receive information from the environment (i.e. a set of external training data). Each visible node in layer 410 takes a low-level feature from an item in the dataset and passes it to the hidden nodes in the next layer 420. When a node in hidden layer 420 receives an input value (x) from a visible node in layer 410, it multiplies (x) by the weight assigned to that connection (edge) and adds it to a bias (b). The result of these two operations is then fed into an activation function which produces the node's output.

In symmetric networks such as Boltzmann machine 400, each node in one layer is connected to every node in the next layer. For example, when node 421 receives input from all of the visible nodes 411-413, each (x) value from the separate nodes is multiplied by its respective weight, and all of the products are summed. The summed products are then added to the hidden layer bias, and the result is passed through the activation function to produce output 431. A similar process is repeated at hidden nodes 422-424 to produce respective outputs 432-434. In the case of a deeper neural network, output 430 of hidden layer 420 serves as an input to the next hidden layer.

Neural networks can be stacked to created deep networks. After training one neural net, the activities of its hidden nodes can be used as training data for a higher level, thereby allowing stacking of neural networks. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

In bottom-up sequential learning, the weights are adjusted at each new hidden layer until that layer is able to approximate the input from the previous lower layer. Alternatively, undirected architecture allows the joint optimization of all levels, rather than sequentially up the layers of the stack.

Figure 5:
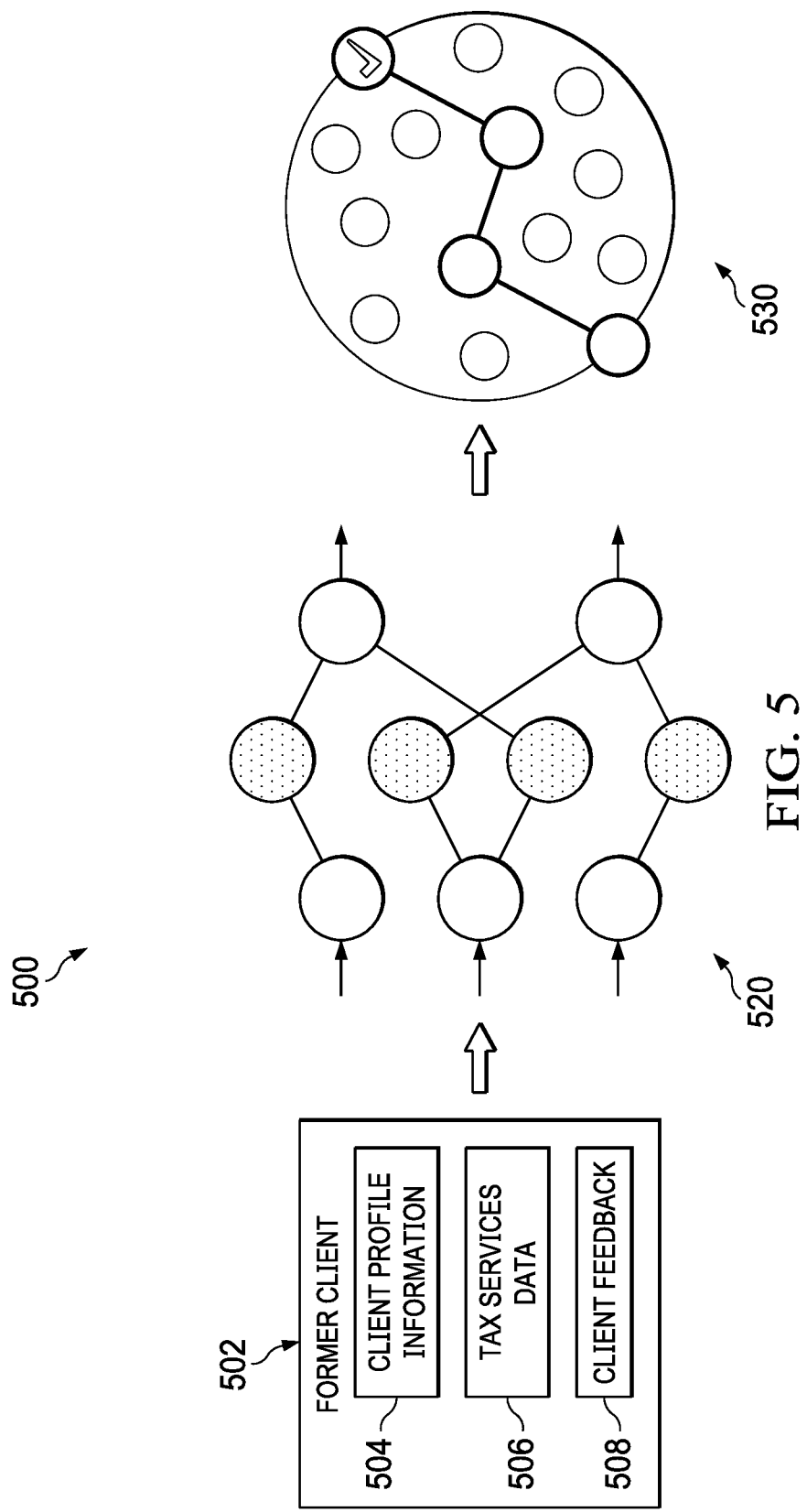
FIG. 5 depicts a process flow for model training in accordance with an illustrative embodiment.

FIG. 5 depicts a process flow for model training in accordance with an illustrative embodiment. One element of the illustrative embodiment is modeling former clients who have previously terminated tax services. As more former clients who have terminated the tax services are modeled, a predictive model for identifying potential client churn is able to develop a more accurate representation of a type of at-risk client that is more likely to terminate the tax services. Current clients can then be compared to the model to determine if they have significant attributes indicating an "at-risk" status.

Model training process 500 begins by collecting specific categories of information about a set of former tax service clients. This information can include client profile information 504 for former client 502 and tax services data 506 related to providing tax services to former client 502, as well as client feedback 508 regarding tax services provided to former client 502.

The information about former client 502 is then fed into neural network 520, which produces concise semantic representation 530 of former client 502.

Figure 6:
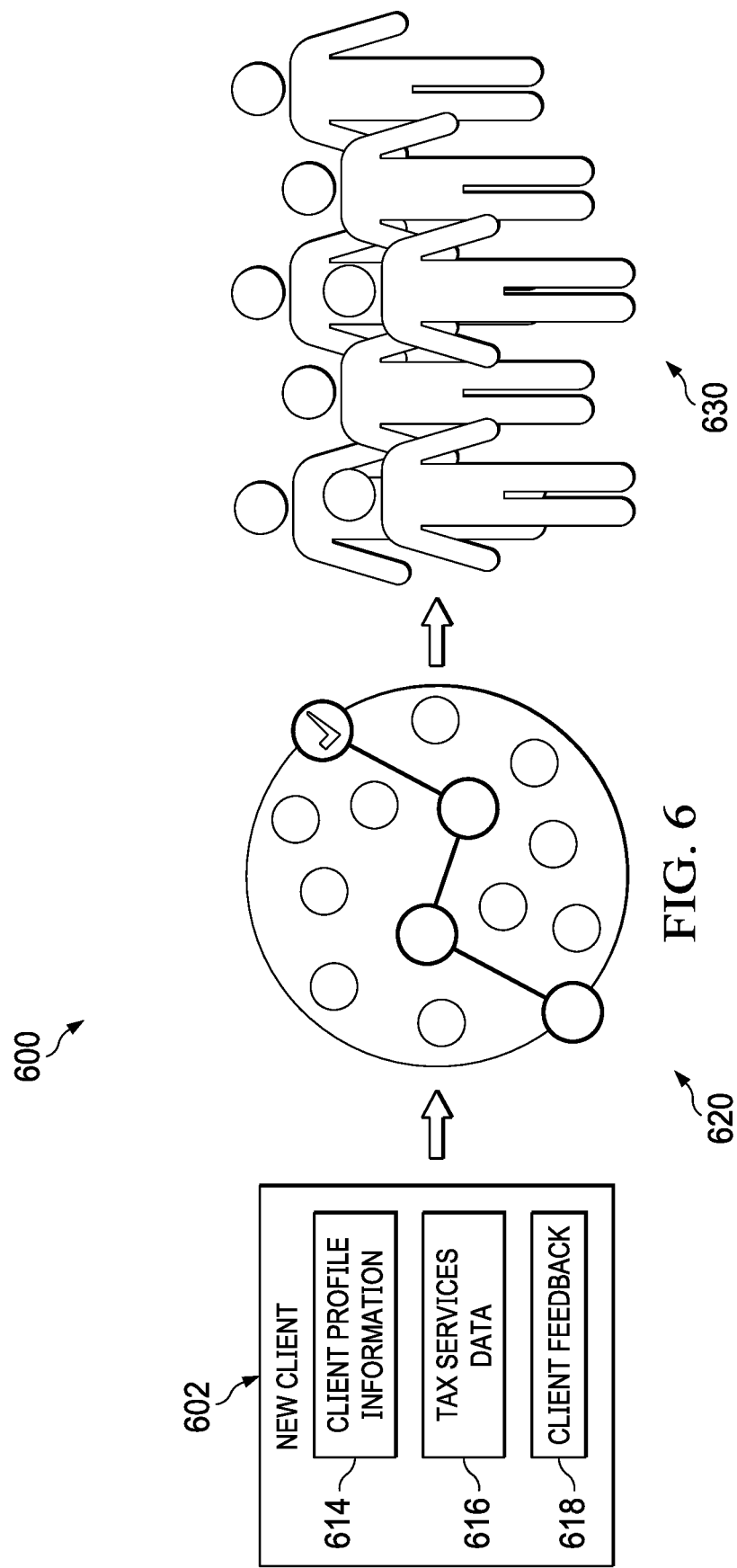
FIG. 6 depicts a process flow for model development in accordance with an illustrative embodiment.

FIG. 6 depicts a process flow for model development in accordance with an illustrative embodiment. Model development process 600 comprises a situation in which data on new client 602 is gathered after the model has already been trained.

Similar to model training process 500, model development process 600 begins by gathering user information regarding client profile information 614 for new client 602 and tax services data 616 related to providing tax services to new client 602, as well as client feedback 618 regarding tax services provided to new client 602.

From this information, process 600 produces concise semantic representation 620 of new client 602 using the model trained in model training process 500. This semantic representation 620 can then be compared to other clients 630 already modeled in the system. This comparison can be based on similarities in client profile information, tax services data, and client feedback and.

As more new users use the system, the model can be updated and refined by the new user information.

Figure 7:
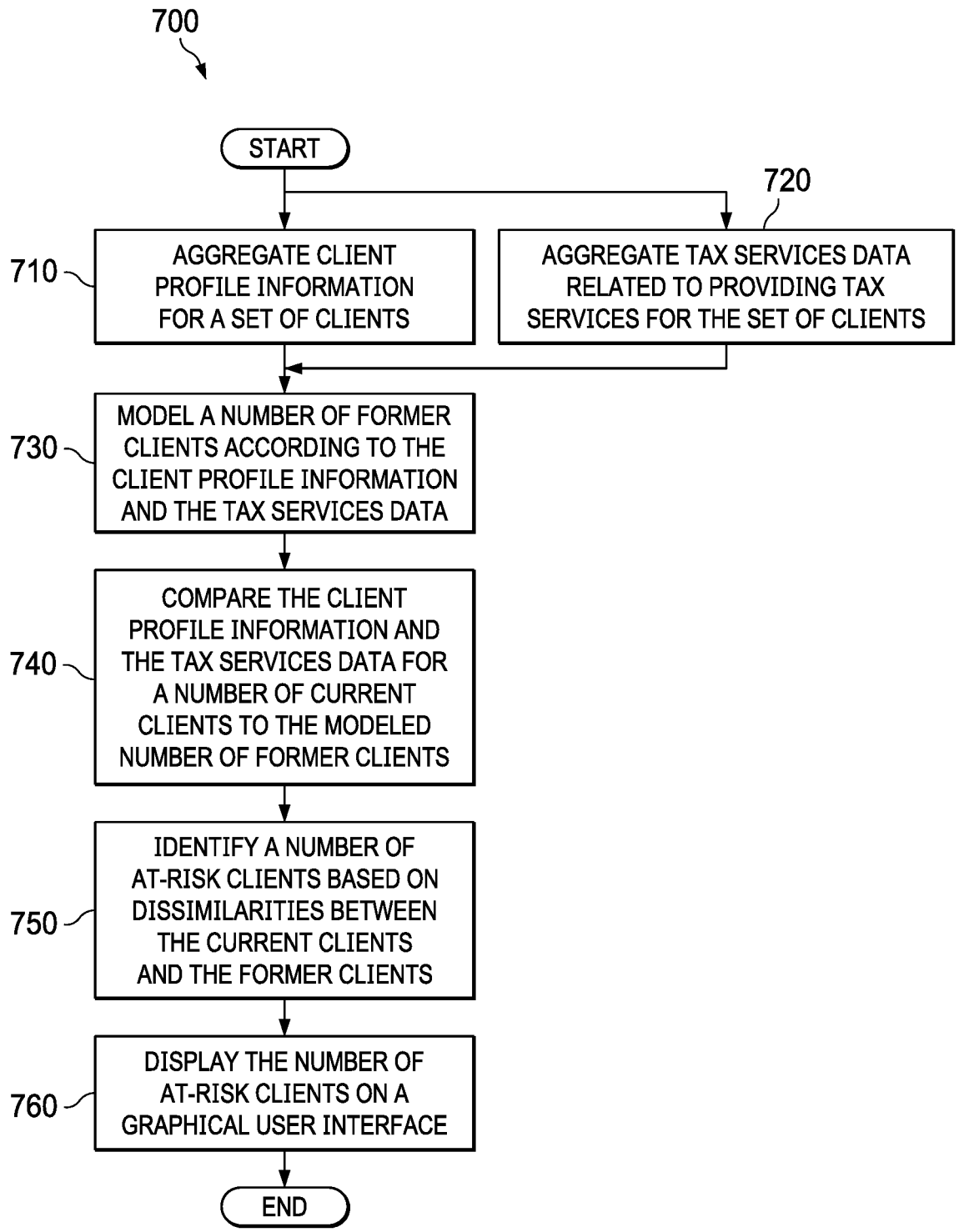
FIG. 7 depicts a flowchart of a process for identifying potential client churn in accordance with an illustrative embodiment.

Referring now to FIG. 7, a flowchart of a process for identifying potential client churn is depicted in accordance with an illustrative embodiment. Process 700 is a software process that can be implemented in one or more of the components of computer system 200 of FIG. 2.

Process 700 begins by aggregating client profile information for a set of clients (step 710) and aggregating tax services data related to providing tax services to the set of clients (step 720).

From this information, process 700 models a number of former clients according to the client profile information and the tax services data (step 730). The process then compares the client profile information and the tax services data for a number of current clients to the modeled number of former clients (step 740).

Based on the comparison, the process identifies a number of at-risk clients based on dissimilarities between the current clients and the former clients (step 750). The process then displays the number of-risk clients on a graphical interface (step 760), with the process terminating thereafter.

Figure 8:
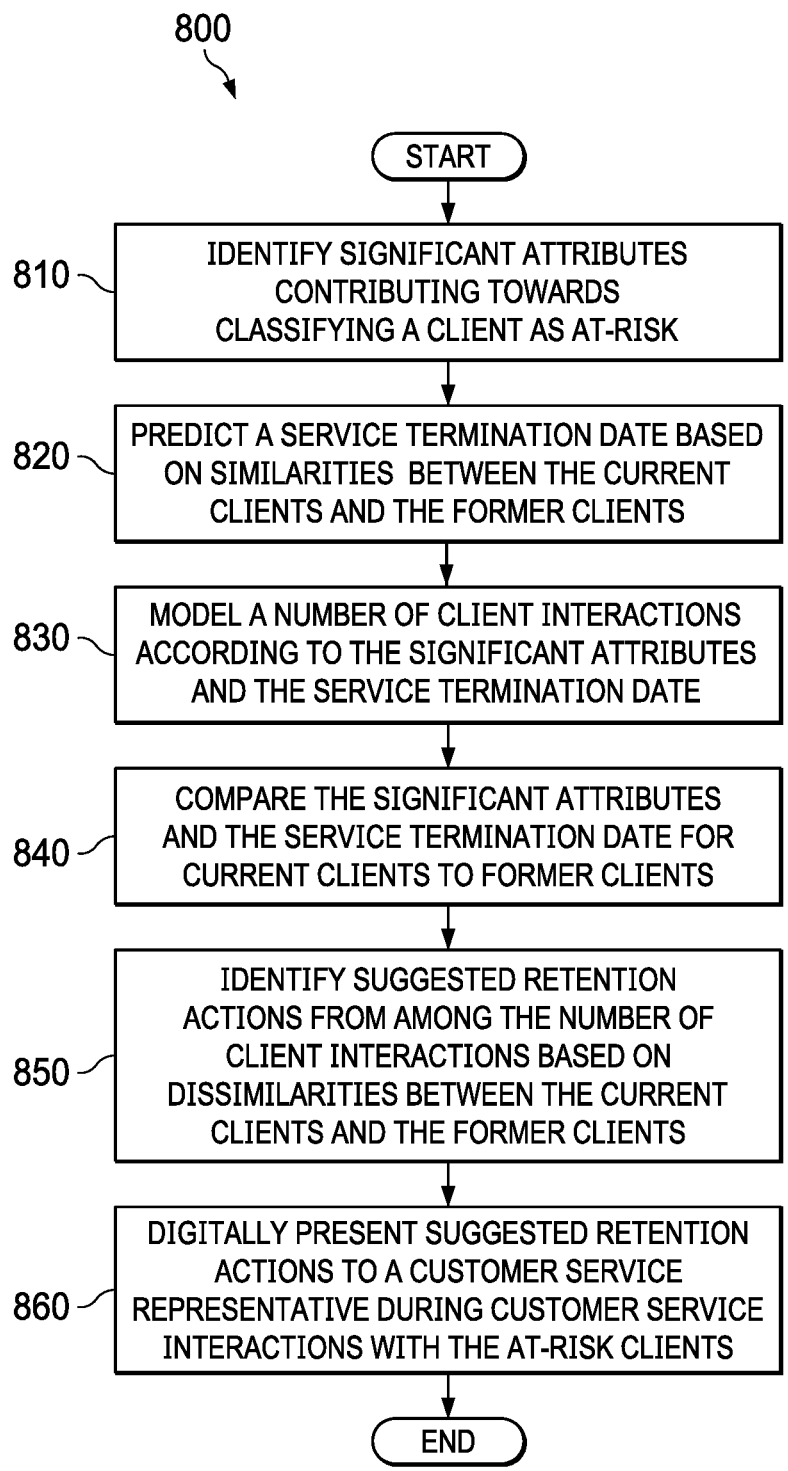
FIG. 8 depicts a flowchart of a process for identifying suggested client retention actions in accordance with an illustrative embodiment.

Referring now to FIG. 8, a flowchart of a process for identifying suggested client retention actions is depicted in accordance with an illustrative embodiment. Process 800 is a software process that can be implemented in one or more of the components of a computer system 200 of FIG. 2.

Process 800 begins by identifying significant attributes contributing towards classifying a client as at-risk (step 810). For example, the significant attributes can be identified from the client profile information and the tax services data modeled according to the process of FIG. 7.

The process predicts a service termination date based on similarities between the current clients and the former clients (step 820). For example, the termination date can be performed using a regression analysis of the at-risk clients as compared to former clients.

From this information, process 800 models a number of client interactions according to significant attributes and the service termination date (step 830). The process then compares the significant attributes and the service termination date for a number of current clients to the modeled number of former clients (step 840).

Based on the comparison, the process identifies a number of suggested retention actions from among the number of client interactions based on dissimilarities between the current clients and the former clients (step 850). The process then digitally presents suggested retention actions to a customer service representative during customer service interactions with the at-risk clients (step 860), with the process terminating thereafter.

Figure 9:
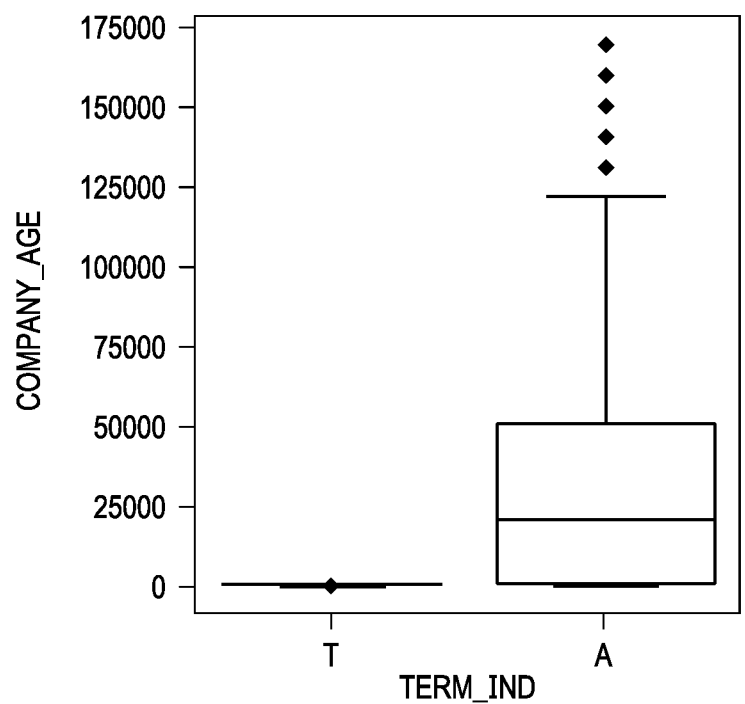
FIG. 9 depicts a graph comparing a company age for current clients and terminated clients in accordance with an illustrative embodiment.
Figure 9:
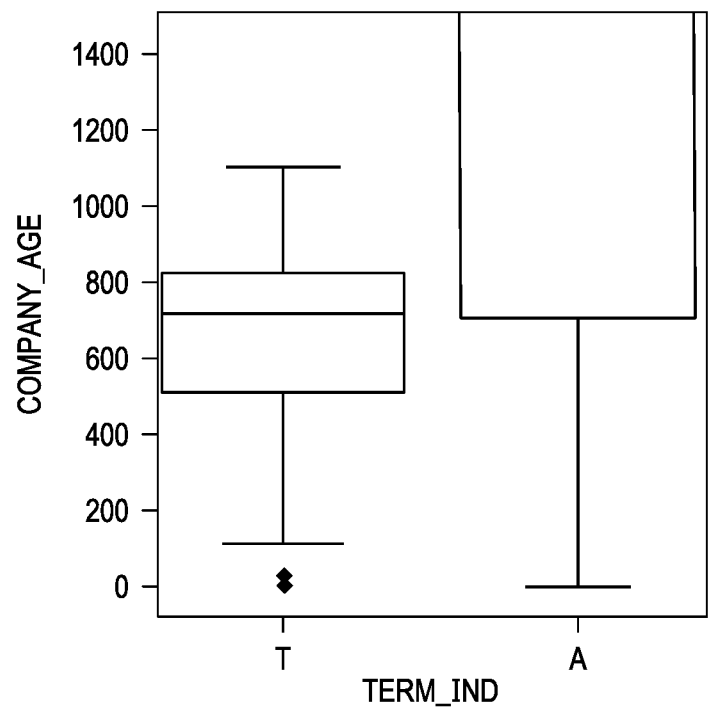

FIG. 9 depicts a graph comparing a company age for current clients and terminated clients in accordance with illustrative embodiments. In one illustrative example, a computer system modeling client data as illustrated in FIG. 2 may identify company age as a significant attribute contributing to termination of tax services. According to one illustrative example, companies with less than two years of age from their establishment date are high-risk to terminate tax services.

Figure 10:
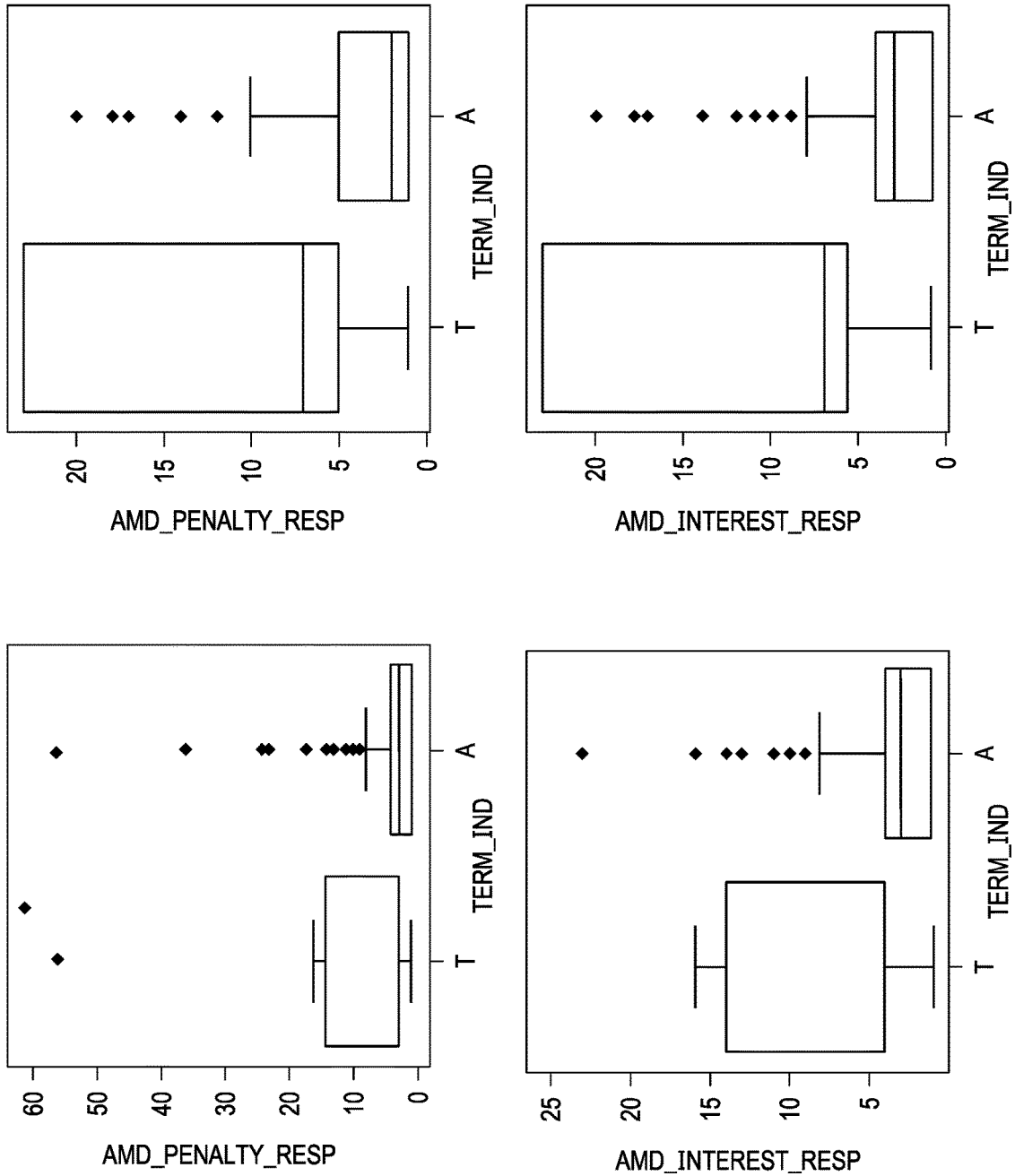
FIG. 10 depicts a graph comparing a number of tax amendments with principal and interest borne by clients for current clients and terminated clients in accordance with an illustrative embodiment.

FIG. 10 depicts a graph comparing a number of tax amendments with principal and interest borne by clients for current clients and terminated clients, according to illustrative embodiments. In one illustrative example, a computer system modeling client data as illustrated in FIG. 2 may identify a number of amendments with principal and interest borne by clients as a significant attribute contributing to the termination of tax services. According to one illustrative example, companies with a high number of amendments with principal and interest borne by clients are high-risk to terminate tax services.

Figure 11:
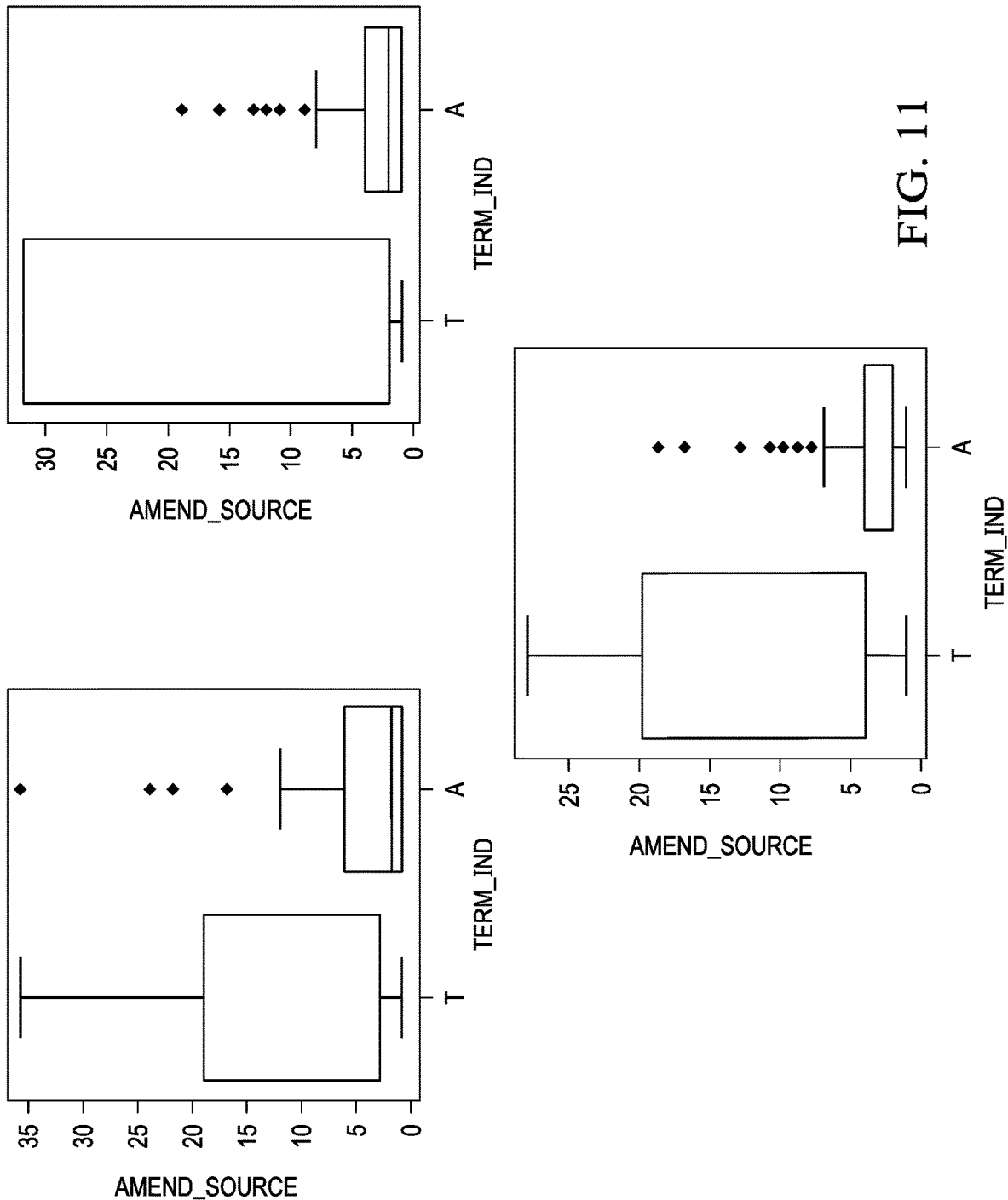
FIG. 11 depicts a graph comparing a number of tax amendments submitted online to correct the employee level data in accordance with an illustrative embodiment.

FIG. 11 depicts a graph comparing a number of tax amendments submitted online to correct employee level data, in accordance with illustrative embodiments. In one illustrative example, a computer system modeling client data as illustrated in FIG. 2 may identify a source of the amendments, such as amendments submitted online via a user interface, as a significant attribute contributing to the termination of tax services. According to one illustrative example, companies with a large number of amendments submitted online to correct employee level data are high-risk to terminate tax services.

Figure 12:
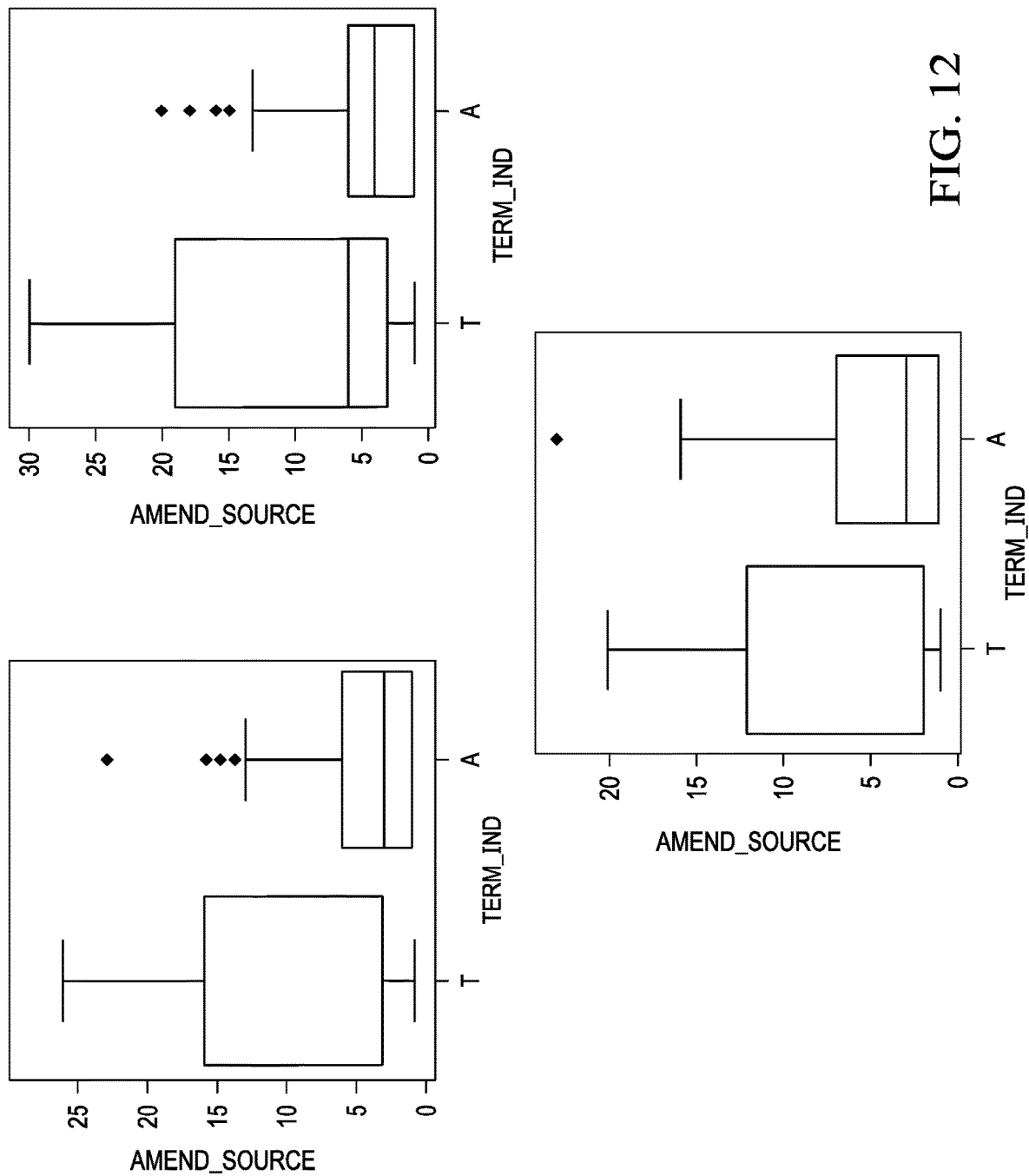
FIG. 12 depicts a graph comparing a number of tax amendments submitted online to correct the employer level data in accordance with an illustrative embodiment.

FIG. 12 depicts a graph comparing a number of tax amendments submitted online to correct employer level data, in accordance with illustrative embodiments. In one illustrative example, a computer system modeling client data as illustrated in FIG. 2 may identify a source of the amendments, such as amendments submitted online via a user interface, as a significant attribute contributing to the termination of tax services. According to one illustrative example, companies with a large number of amendments submitted online to correct employer level data are high-risk to terminate tax services.

Figure 13:
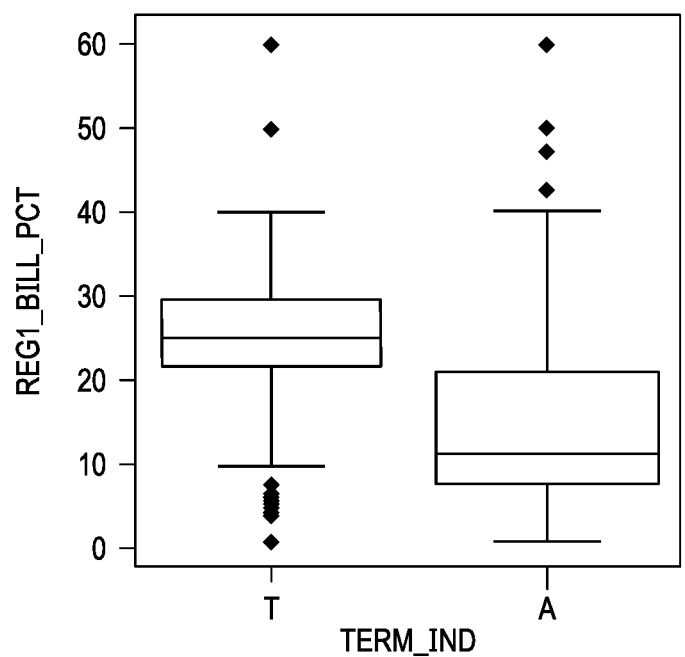
FIG. 13 depicts a graph comparing a Regions and Average Billings in accordance with an illustrative embodiment.
Figure 13:
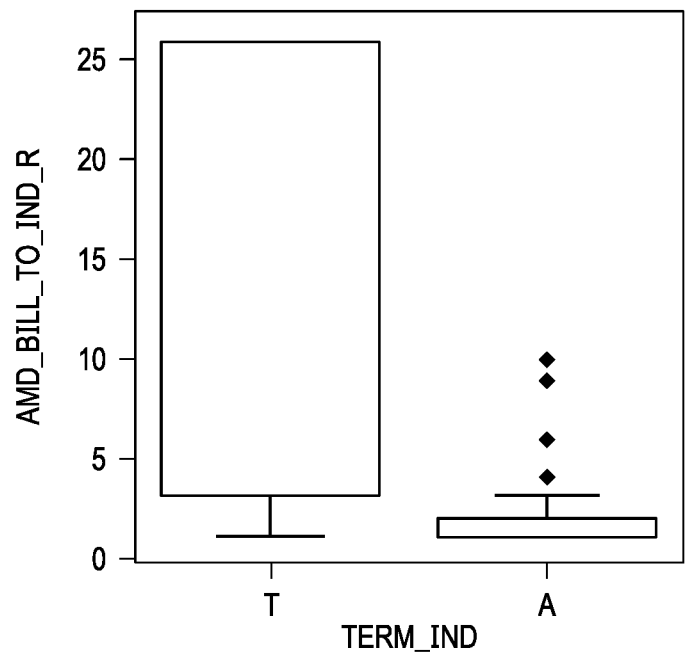

FIG. 13 depicts a graph comparing a regions and average billings in accordance with illustrative embodiments. In one illustrative example, a computer system modeling client data as illustrated in FIG. 2 may identify a number of amendments billed to regions and average billings presented against the amendments as a significant attribute contributing to the termination of tax services. According to one illustrative example, companies with a large number of a number of amendments billed to regions and average billings presented against the amendments are high-risk to terminate tax services.

Figure 14:
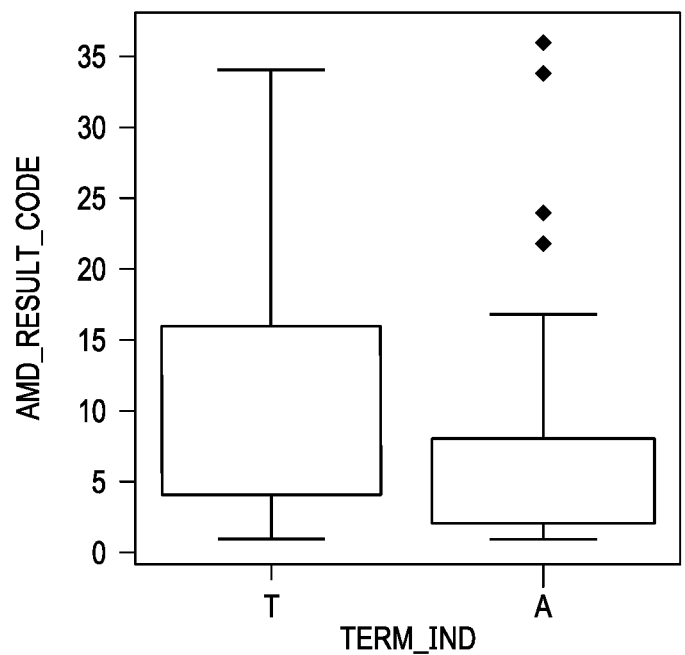
FIG. 14 depicts a graph comparing identification change amendments in accordance with an illustrative embodiment.
Figure 14:
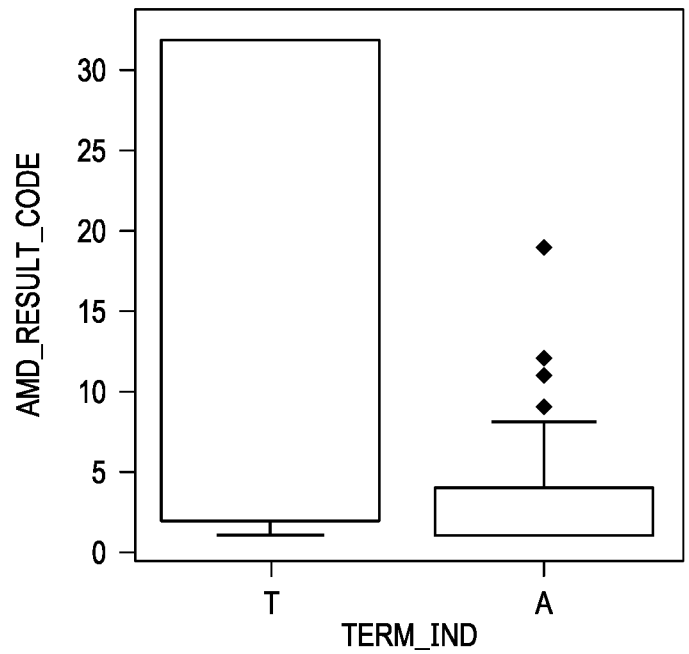

FIG. 14 depicts a graph comparing identification change amendments in accordance with illustrative embodiments. In one illustrative example, a computer system modeling client data as illustrated in FIG. 2 may identify a number of submitted identification change amendments as a significant attribute contributing to termination of tax services. According to one illustrative example, companies submitting a large number of identification change amendments are high-risk to terminate tax services.

Figure 15:
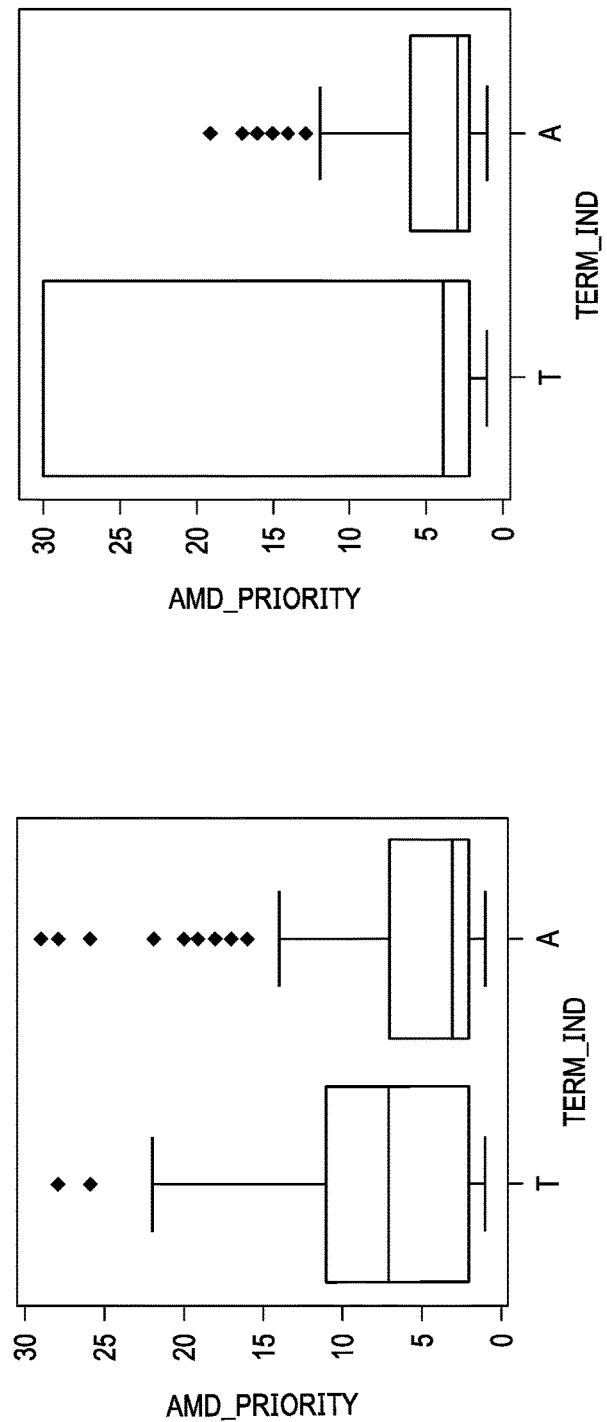
FIG. 15 depicts a graph comparing low priority amendments in accordance with an illustrative embodiment.

FIG. 15 depicts a graph comparing low priority amendments according to illustrative embodiments. In one illustrative example, a computer system modeling client data as illustrated in FIG. 2 may identify a number of low priority amendments, such as social security number changes, wage changes, and other amendments which do not result into no filing or payment, as a significant attribute contributing to the termination of tax services. According to one illustrative example, companies submitting a large number of low priority amendments are high-risk to terminate tax services.

Figure 16:
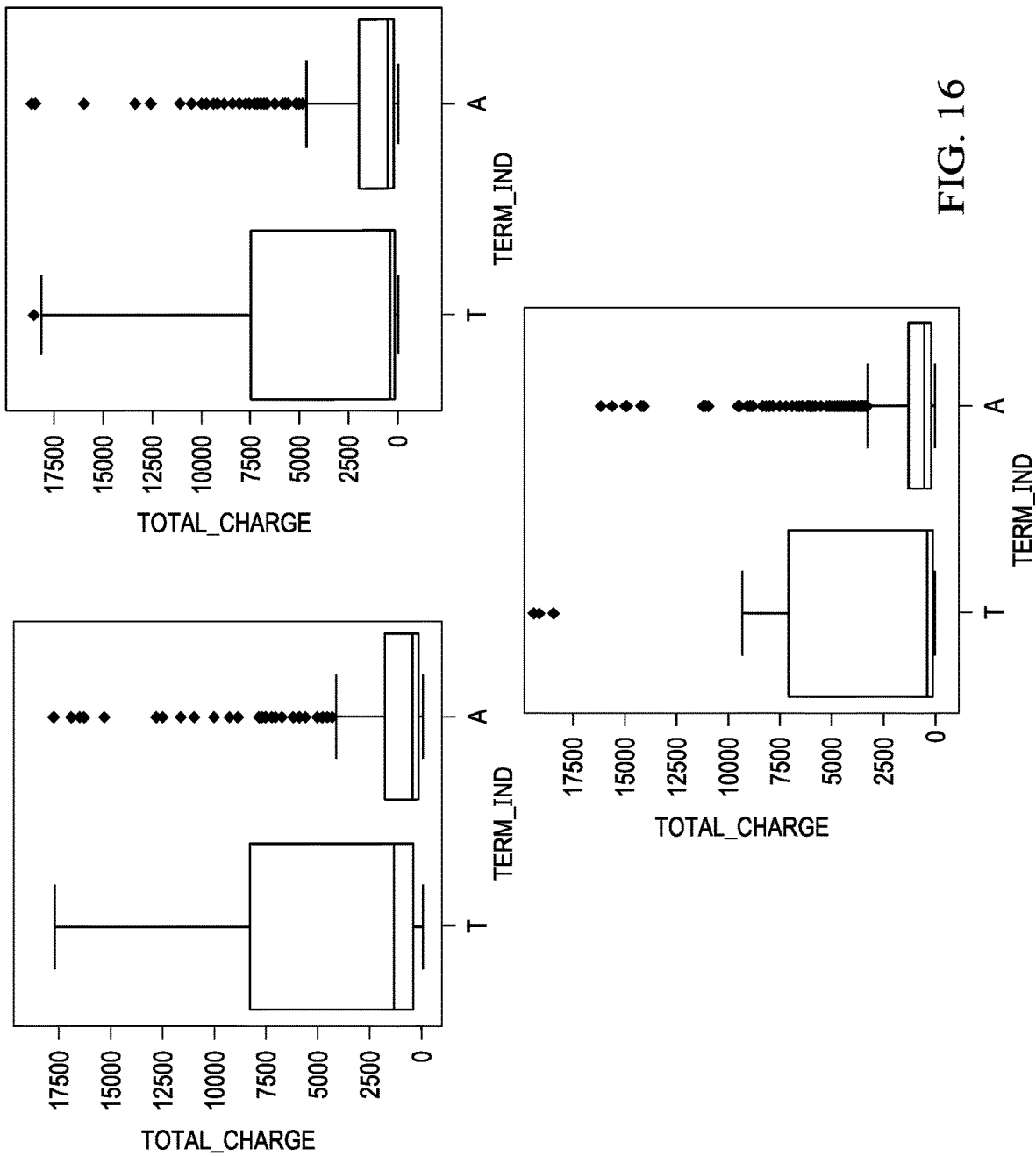
FIG. 16 depicts a graph comparing total charges for amendments in accordance with an illustrative embodiment.

FIG. 16 depicts a graph comparing total charges for amendments according to illustrative embodiments. In one illustrative example, a computer system modeling client data as illustrated in FIG. 2 may identify total charges for amendments as a significant attribute contributing to the termination of tax services. According to one illustrative example, companies incurring a large total charge for amendments are high-risk to terminate tax services.

Figure 17:
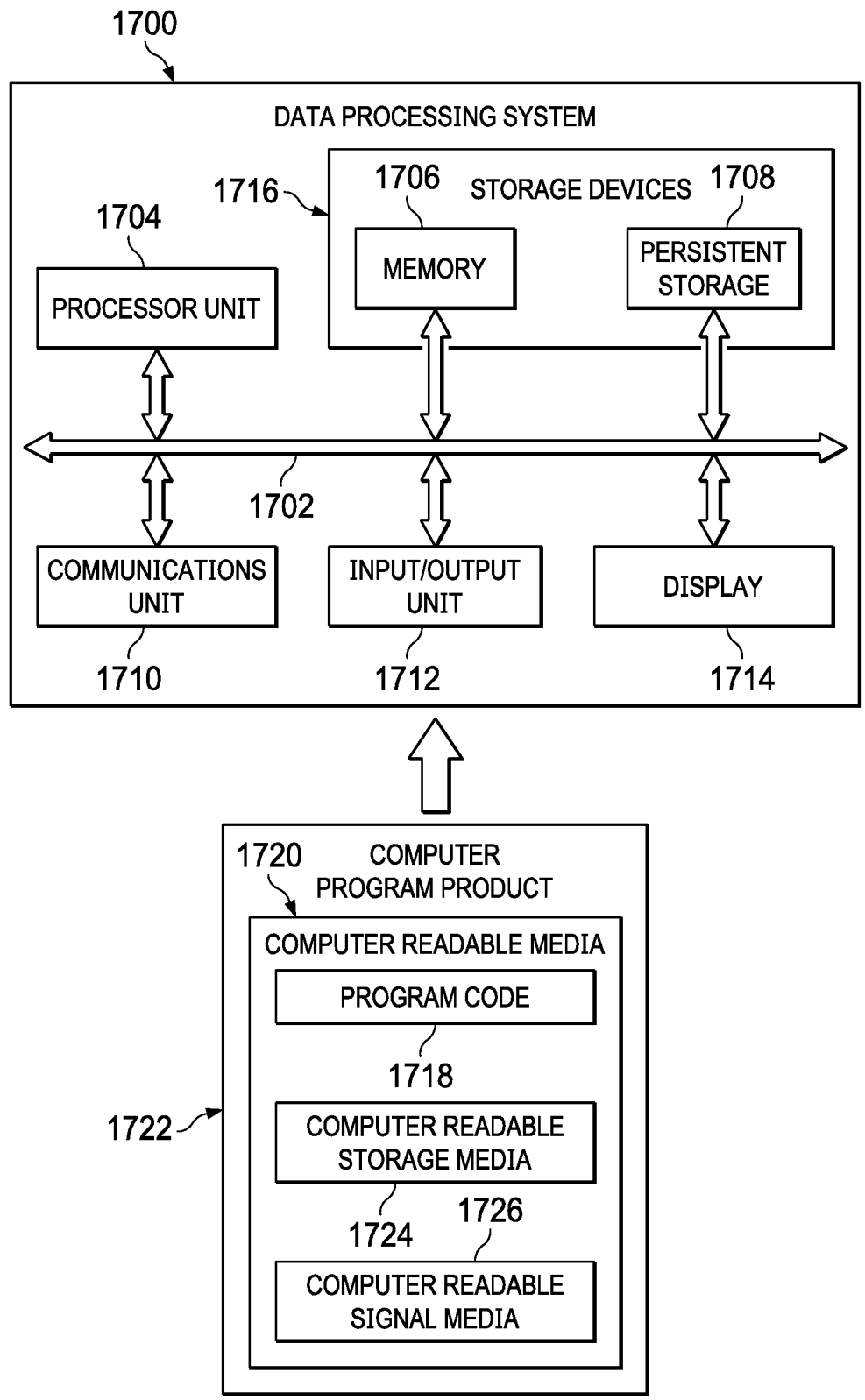
FIG. 17 is an illustration of a block diagram of a data processing system in accordance with an illustrative embodiment.

Turning now to FIG. 17, an illustration of a block diagram of a data processing system is depicted in accordance with an illustrative embodiment. Data processing system 1700 may be used to implement one or more computers and client computer system 112 in FIG. 1. In this illustrative example, data processing system 1700 includes communications framework 1702, which provides communications between processor unit 1704, memory 1706, persistent storage 1708, communications unit 1710, input/output unit 1712, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation. In an embodiment, processor unit 1704 comprises one or more conventional general purpose central processing units (CPUs). In an alternate embodiment, processor unit 1704 comprises one or more graphical processing units (CPUs).

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1716, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708. Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer-usable program code, or computer-readable program code that may be read and executed by a processor in processor unit 1704. The program code in the different embodiments may be embodied on different physical or computer-readable storage media, such as memory 1706 or persistent storage 1708.

Program code 1718 is located in a functional form on computer-readable media 1720 that is selectively removable and may be loaded onto or transferred to data processing system 1700 for execution by processor unit 1704. Program code 1718 and computer-readable media 1720 form computer program product 1722 in these illustrative examples. In one example, computer-readable media 1720 may be computer-readable storage media 1724 or computer-readable signal media 1726.

In these illustrative examples, computer-readable storage media 1724 is a physical or tangible storage device used to store program code 1718 rather than a medium that propagates or transmits program code 1718. Alternatively, program code 1718 may be transferred to data processing system 1700 using computer-readable signal media 1726.

Computer-readable signal media 1726 may be, for example, a propagated data signal containing program code 1718. For example, computer-readable signal media 1726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of identifying and controlling potential client deactivations, the method comprising:
    aggregating, by one or more processors, client profile information for a set of clients;
    aggregating, by one or more processors, tax services data related to providing tax services for the set of clients;
    creating, by the one or more processors using at least a portion of the client profile information and at least a portion of the tax services data, a first set of training data for a neural network;
    training, by the one or more processors using the first set of training data, the neural network to identify potential deactivation clients;
    obtaining, by the one or more processors, client profile information and tax services data for a number of current clients;
    identifying, by the one or more processors using the neural network, a number of potential deactivation clients from among the number of current clients based on dissimilarities between the current clients and the former clients;
    identifying, by the one or more processors using the neural network, significant attributes contributing towards classifying the number of potential deactivation clients as potential for deactivation based on similarities among the number of potential deactivation clients;
    predicting, by the one or more processors using the neural network, a service termination date based on similarities between the number of current clients and the number of former clients using a regression analysis of the number of potential deactivation clients as compared to the number of former clients;
    identifying, by the one or more processors based on dissimilarities between the number current clients and the number of former clients, a set of retention actions for the number of potential deactivation clients;
    detecting, by the one or more processors, a customer service interaction between a customer service representative device and a potential deactivation client device; and
    displaying, by the one or more processors responsive to detection of the customer service interaction, at least one retention action on a graphical user interface to reduce a potential client deactivation.

2. The computer-implemented method of claim 1, wherein the tax services data is aggregated from client interaction records.

3. The computer-implemented method of claim 1, wherein the tax services data is aggregated from tax agency notices comprising at least one of:
    a date of the tax agency notice, a priority of the tax agency notice, a principal and interest amount indicated in the tax agency notice, a tax type indicated in the tax agency notice, and a filing type indicated in the tax agency notice, and combinations thereof.

4. The computer-implemented method of claim 1, wherein the tax services data is aggregated from tax amendment records comprising at least one of:
    a source of the amendment, an amendment start date, a number of jurisdictions amended under the amendment, a number of employees amended under the amendment, charges imposed for the amendment, a waiver amount applied to the amendment, a total check amount requested, a refund amount realized from the amendment, a credit amount realized from the amendment, a penalty amount for the amendment, an interest amount for the amendment, a penalty responsibility Indicator, an interest responsibility indicator, an amendment priority, an amendment billed to, a percentage of amendment bill borne by client, a percentage of amendment bill borne by region, a percentage of amendment bill borne by tax, a complexity W2 calculation involved, and combinations thereof.

5. The computer-implemented method of claim 1, wherein the tax services data aggregated from client service interaction records comprises at least one of:
    a time taken to close the client service interaction, a type of service requested, an indication of completion of the client service interaction, a creditor indication of the client, a waiver request, a check request, a late deposit, a CPA indication, a duplicate indicator, a multi-tax indicator, a request origin indicator, an agency call indicator, a reason indicator, and combinations thereof.

6. The computer-implemented method of claim 1, wherein the tax services data is aggregated from client feedback comprising at least one of feedback in client service interactions, and feedback in public comments on social media networks.

7. The computer-implemented method of claim 1, further comprising:
    modeling, by the one or more processors, a number of client interactions according to the significant attributes and the service termination date;
    comparing, by the one or more processors, the significant attributes and the service termination date to the significant attributes and a service termination date of former clients; and
    identifying, by the one or more processors, a set of suggested retention actions from among the number of client interactions based on dissimilarities between the number current clients and the number of former clients.

8. The computer-implemented method of claim 7, further comprising:
digitally presenting the set of suggested retention actions to a customer service representative during client service interactions with the number of potential deactivation clients.

9. A computer system for identifying and controlling potential client deactivations, the system comprising:
a bus system;
a storage device connected to the bus system, wherein the storage device stores program instructions; and
one or more processors connected to the bus system, wherein the number of processors execute the program instructions:
to aggregate client profile information for a set of clients;
to aggregate tax services data related to providing tax services for the set of clients;
to create, using at least a portion of the client profile information and at least a portion of the tax services data, a first set of training data for a neural network;
to train, using the first set of training data, the neural network to identify potential deactivation clients;
to obtain client profile information and tax services data for a number of current clients;
to identify, using the neural network, a number of potential deactivation clients from among the number of current clients based on dissimilarities between the current clients and the former clients;
to identify, using the neural network, significant attributes contributing towards classifying the number of potential deactivation clients as potential for deactivation based on similarities among the number of potential deactivation clients;
to predict, using the neural network, a service termination date based on similarities between the number of current clients and the number of former clients;
to identify, based on dissimilarities between the number of current clients and the number of former clients, a set of retention actions for the number of potential deactivation clients;
to detect a customer service interaction between a customer service representative device and a potential deactivation client device; and
to display, responsive to detection of the customer service interaction, at least one retention action on a graphical user interface to reduce a potential client deactivation.

10. The computer system of claim 9, wherein the tax services data is aggregated from client interaction records.

11. The computer system of claim 9, wherein the tax services data is aggregated from tax agency notices comprising at least one of:
a date of the tax agency notice, a priority of the tax agency notice, a principal and interest amount indicated in the tax agency notice, a tax type indicated in the tax agency notice, and a filing type indicated in the tax agency notice, and combinations thereof.

12. The computer system of claim 9, wherein the tax services data is aggregated from tax amendment filings comprising at least one of:
a type of amendment, a source of the amendment, an amendment start date, a number of jurisdictions amended under the amendment, a number of employees amended under the amendment, charges imposed for the amendment, a waiver amount applied to the amendment, a total check amount requested, a refund amount realized from the amendment, a credit amount realized from the amendment, a penalty amount for the amendment, an interest amount for the amendment, a penalty responsibility indicator, an interest responsibility indicator, an amendment priority, an amendment billed to, a percentage of amendment bill borne by client, a percentage of amendment bill borne by region, a percentage of amendment bill borne by tax, a complexity W2 calculation involved, and combinations thereof.

13. The computer system of claim 9, wherein the tax services data is aggregated from client service interaction records comprising at least one of:
a time taken to close the client service interaction, a type of service requested, an indication of completion of the client service interaction, a creditor indication of the client, a waiver request, a check request, a late deposit, a CPA indication, a duplicate indicator, a multi-tax indicator, a request origin indicator, an agency call indicator, and a reason indicator.

14. The computer system of claim 9, wherein the tax services data is aggregated from client feedback comprising at least one of feedback in client service interactions, feedback in client satisfaction surveys, and feedback in public comments on social media networks.

15. The computer system of claim 9, wherein the one or more processors further execute the program instructions:
to model a number of client interactions according to the significant attributes and the service termination date;
to compare the significant attributes and the service termination date for the number of potential deactivation clients to the significant attributes and a service termination date of former clients; and
to identify a set of suggested retention actions from among the number of client interactions based on dissimilarities between the current clients and the former clients.

16. The computer system of claim 15, wherein the one or more processors further execute the program instructions:
to digitally present the set of suggested retention actions to a customer service representative during client service interactions with the number of potential deactivation clients.

17. A computer program product for identifying and controlling potential client deactivations, the computer program product comprising:
a non-transitory computer readable storage medium;
program code, stored on the computer readable storage medium, for aggregating, by one or more processors, client profile information for a set of clients;
program code, stored on the computer readable storage medium, for aggregating, by the one or more processors, tax services data related to providing tax services for the set of clients;
program code, stored on the computer readable storage medium, for creating, by the one or more processors using at least a portion of the client profile information and at least a portion of the tax services data, a first set of training data for a neural network;
program code, stored on the computer readable storage medium, for training, by the one or more processors using the first set of training data, the neural network to identify potential deactivation clients;
program code, stored on the computer readable storage medium, for obtaining, by the one or more processors, client profile information and tax services data for a number of current clients;

program code, stored on the computer readable storage medium, for identifying, by the one or more processors using the neural network, a number of potential deactivation clients from among the number of current clients based on dissimilarities between the current clients and the former clients;

program code, stored on the computer readable storage medium, for identifying, by the one or more processors using the neural network, significant attributes contributing towards classifying the number of potential deactivation clients as potential for deactivation based on similarities among the the number of potential deactivation clients;

program code, stored on the computer readable storage medium, for predicting, by the one or more processors using the neural network, a service termination date based on similarities between the number of current clients and the number of former clients using a regression analysis of the number of potential deactivation clients as compared to number of former clients;

program code, stored on the computer readable storage medium, for identifying, by the one or more processors based on dissimilarities between the number current clients and the number of former clients, a set of retention actions for the number of potential deactivation clients;

program code, stored on the computer readable storage medium, for detecting, by the one or more processors, a customer service interaction between a customer service representative device and a potential deactivation client device; and program code, stored on the computer readable storage medium, for displaying, by the one or more processors responsive to detection of the customer service interaction, at least one retention action on a graphical user interface to reduce a potential client deactivation.

18. The computer program product of claim 17, wherein the tax services data is aggregated from client interaction records.

19. The computer program product of claim 17, wherein the tax services data is aggregated from tax agency notices comprising at least one of:
a date of the tax agency notice, a priority of the tax agency notice, a principal and interest amount indicated in the tax agency notice, a tax type indicated in the tax agency notice, and a filing type indicated in the tax agency notice, and combinations thereof.

20. The computer program product of claim 17, wherein the tax services data is aggregated from tax amendment filings comprising at least one of:
a source of the amendment, an amendment start date, a number of jurisdictions amended under the amendment, a number of employees amended under the amendment, charges imposed for the amendment, a waiver amount applied to the amendment, a total check amount requested, a refund amount realized from the amendment, a credit amount realized from the amendment, a penalty amount for the amendment, an interest amount for the amendment, a penalty responsibility indicator, an interest responsibility indicator, an amendment priority, an amendment billed to, a percentage of amendment bill borne by client, a percentage of amendment bill borne by region, a percentage of amendment bill borne by tax, a complexity W2 calculation involved, and combinations thereof.

21. The computer program product of claim 17, wherein the tax services data is aggregated from client service interaction records comprising at least one of:
a time taken to close the client service interaction, a type of service requested, an indication of completion of the client service interaction, a creditor indication of the client, a waiver request, a check request, a late deposit, a CPA indication, a duplicate indicator, a multi-tax indicator, a request origin indicator, an agency call indicator, and a reason indicator.

22. The computer program product of claim 17, wherein the tax services data is aggregated from client feedback comprising at least one of feedback in client service interactions, and feedback in public comments on social media networks.

23. The computer program product of claim 17, further comprising:
program code, stored on the computer readable medium, for modeling, by the one or more processors, a number of client interactions according to the significant attributes and the service termination date;

program code, stored on the computer readable medium, for comparing, by the one or more processors, the significant attributes and the service termination date for the number of current clients to the significant attributes and a service termination date of former clients; and program code, stored on the computer readable medium, for identifying, by the one or more processors, a set of suggested retention actions from among the number of client interactions based on dissimilarities between the number of current clients and the number of former clients.

24. The computer program product of claim 23, further comprising:
program code, stored on the computer readable storage medium, for digitally presenting, by the one or more processors, the set of suggested retention actions to a customer service representative during client service interactions with the number of potential deactivation clients.

* * * * *